(12) United States Patent
Luoma et al.

(10) Patent No.: US 6,750,829 B2
(45) Date of Patent: *Jun. 15, 2004

(54) OUTDOOR CHANGEABLE MESSAGE SIGN

(75) Inventors: Eugene Luoma, Duluth, MN (US); James L. Blesener, White Lake Bear, MN (US); John P. Nicholson, Shoreview, MN (US)

(73) Assignee: ADDCO, Inc., St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/102,510

(22) Filed: Mar. 19, 2002

(65) Prior Publication Data

US 2002/0175881 A1 Nov. 28, 2002

Related U.S. Application Data

(63) Continuation-in-part of application No. 09/716,811, filed on Nov. 20, 2000, now Pat. No. 6,414,650, which is a continuation-in-part of application No. 09/141,007, filed on Aug. 26, 1998, now Pat. No. 6,150,996, which is a continuation-in-part of application No. 08/833,945, filed on Apr. 14, 1997, now Pat. No. 6,175,342, which is a continuation-in-part of application No. 08/634,031, filed on Apr. 15, 1996, now Pat. No. 5,914,698, application No. 10/102,510, which is a continuation-in-part of application No. 08/976,910, filed on Nov. 24, 1997, now abandoned, which is a continuation-in-part of application No. 08/651,834, filed on May 21, 1996, now abandoned, which is a division of application No. 08/286,675, filed on Aug. 5, 1994, now Pat. No. 5,542,203, and a continuation-in-part of application No. 08/833,945, filed on Apr. 14, 1997, now Pat. No. 6,175,342, which is a continuation-in-part of application No. 08/634,031, filed on Apr. 15, 1996, now Pat. No. 5,914,698.

(51) Int. Cl.[7] .................................................. G09G 5/00
(52) U.S. Cl. ............................................. 345/1.1; 345/84
(58) Field of Search ............................ 345/1.1, 1.2, 1.3, 345/2.1, 82, 83, 84, 56, 903, 90, 102; 362/119; 313/500; 40/576, 610; 340/908.1

(56) References Cited

U.S. PATENT DOCUMENTS

| | | | |
|---|---|---|---|
| 4,050,823 A | 9/1977 | Lee | |
| 4,077,144 A | 3/1978 | Smits | 40/590 |
| 4,163,332 A | 8/1979 | Salam | |
| 4,281,369 A | 7/1981 | Batte | 362/183 |
| 4,567,082 A | 1/1986 | Tabata et al. | 428/138 |
| 4,724,629 A | 2/1988 | Walton | 40/447 |
| 4,989,124 A | 1/1991 | Shappell | 362/183 |
| 4,998,365 A | 3/1991 | Bezek | 40/451 |
| 5,020,253 A | 6/1991 | Lie et al. | |
| 5,230,175 A | 7/1993 | Follis | |
| 5,497,573 A | 3/1996 | Stadjuhar et al. | 40/564 |
| 5,542,203 A * | 8/1996 | Luoma et al. | 40/610 |

(List continued on next page.)

FOREIGN PATENT DOCUMENTS

| | | |
|---|---|---|
| GB | 2173 338 A | 3/1986 |
| JP | S62-74284 | 10/1985 |

*Primary Examiner*—Bipin Shalwala
*Assistant Examiner*—Mansour M. Said
(74) *Attorney, Agent, or Firm*—Patterson, Thuente, Skaar & Christensen, P.A.

(57) ABSTRACT

A preferred embodiment of the present invention is a mobile sign with a solar panel for warning motorists of highway problems. The mobile sign comprises support structure configured as a wheeled vehicle. In preferred embodiments, the sign panel comprises an enclosure or housing having a front transparent panel, a multiplicity of LED's in a matrixical arrangement for generating electronically changeable messages mounted in the enclosure and spaced from the front panel, and a pattern of opaque material, for example paint, applied on the exterior of the front transparent panel defining a plurality of windows for passing light therethrough. In a preferred embodiment, the windows will be in a matrixical arrangement comprising a plurality of rows and columns of individual LED's or rows and columns of groupings of LEDs.

15 Claims, 7 Drawing Sheets

U.S. PATENT DOCUMENTS

| | | | | |
|---|---|---|---|---|
| 5,621,225 A | * | 4/1997 | Shieh et al. | 257/81 |
| 5,697,176 A | * | 12/1997 | Kuni, Jr. et al. | 40/591 |
| 5,914,698 A | * | 6/1999 | Nicholson et al. | 345/1.1 |
| 6,088,008 A | * | 7/2000 | Reeder | 345/33 |
| 6,150,996 A | * | 11/2000 | Nicholson et al. | 345/1.1 |
| 6,175,342 B1 | * | 1/2001 | Nicholson et al. | 345/1.1 |
| 6,329,758 B1 | * | 12/2001 | Salam | 315/169.2 |
| 6,414,650 B1 | * | 7/2002 | Nicholson et al. | 345/1.1 |

* cited by examiner

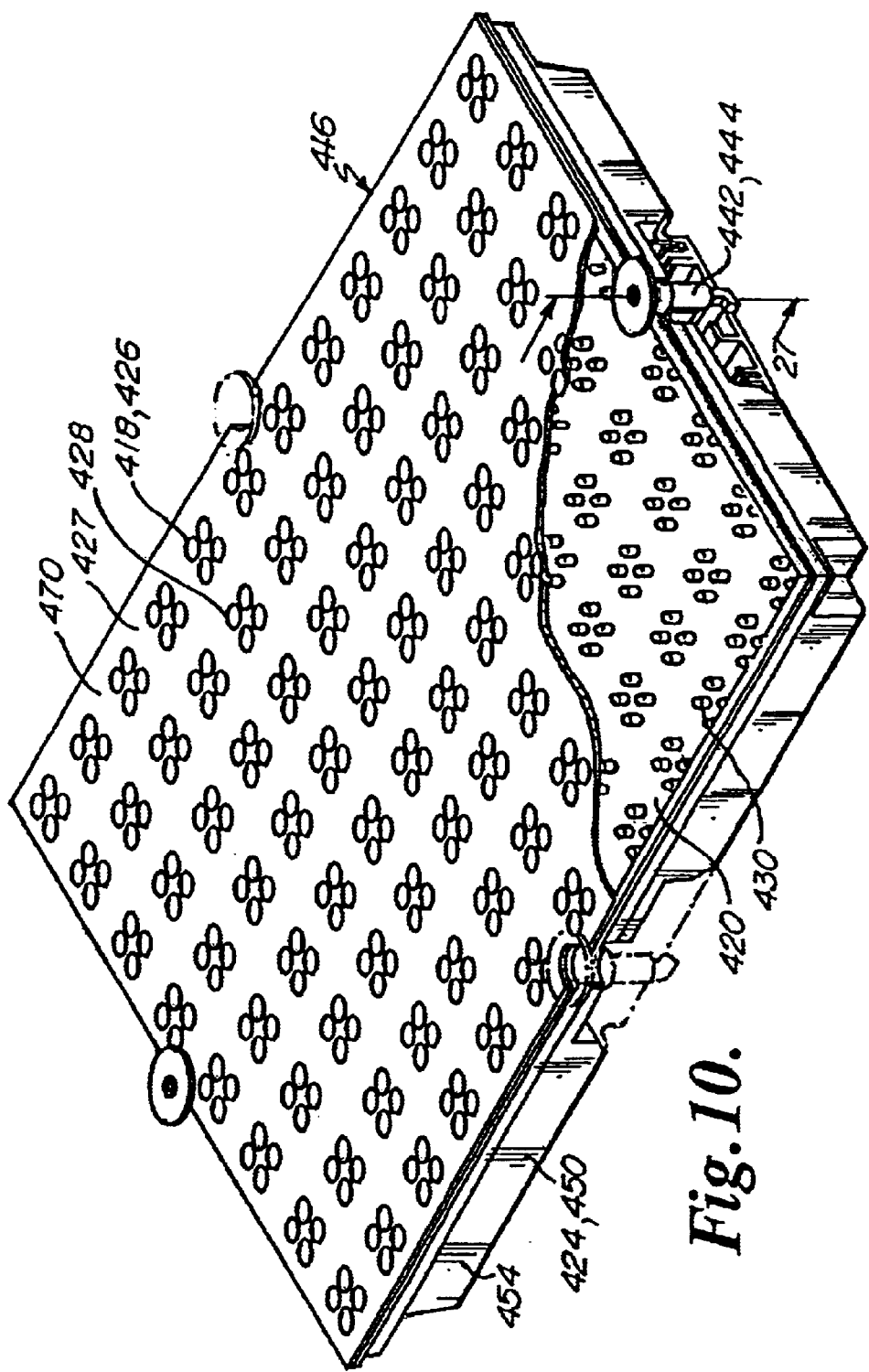

OUTDOOR CHANGEABLE MESSAGE SIGN

This application is a continuation-in-part of Ser. No. 09/716,811 U.S. Pat. No. 6,414,650, filed on Nov. 20, 2000, and entitled SIGN SYSTEM WITH FIELD CHANGEABLE SCREEN SIZE AND MESSAGE; which is a continuation-in-part of Ser. No. 09/141/007, filed on Aug. 26, 1998 and now U.S. Pat. No. 6,150,996; which is a continuation-in-part of Ser. No. 08/833,945, filed on Apr. 14, 1997, and now U.S. Pat. No. 6,175,342; which is a continuation-in-part of Ser. No. 08/634,031, filed on Apr. 15, 1996, and now U.S. Pat. No. 5,914,698. All of the above applications and patents are incorporated herein by reference.

This application is also a continuation-in-part of Ser. No. 08/976,910, filed on Nov. 24, 1997 ABN, and entitled MOBILE SIGN WITH SOLAR PANEL, which is a continuation-in-part of application Ser. No. 08/651,834, filed on May 21, 1996 ABN, and entitled MOBILE SIGN WITH SOLAR PANEL; which is a divisional of Ser. No. 08/286,675, U.S. Pat. No. 5,542,203, issued Aug. 5, 1994 and entitled MOBILE SIGN WITH SOLAR PANEL; and a continuation-in-part of application Ser. No. 08/833,945 U.S. Pat. No. 6,175,342, filed Apr. 14, 1997, and entitled ENHANCED MODULAR MESSAGE BOARD; which is a continuation-in-part of application Ser. No. 08/634,031 Apr. 15, 1996, now U.S. Pat. No. 5,914,698. All of the above applications and patents are incorporated herein by reference.

BACKROUND OF THE INVENTION

The present invention relates to outdoor signs, and in particular to mobile electronically changeable signs for use adjacent to roadways.

Highway warning signs are frequently needed to warn motorists of obstructions, traffic delays, and hazardous conditions as such conditions arise. To be most useful, a highway warning sign should be mobile so that the sign may be transported to the needed site. Once the sign has been moved to the needed site, the sign may be left along the roadway to warn passing motorists. Generally, the sign must be readable from at least 150 feet and often from much farther away.

In order to be visible in a variety of lighting conditions (bright sunlight, overcast, nighttime, etc.) the sign's warning should be illuminated, i.e., the sign elements should be electrically powered. The sign elements may be light emitting diodes (LEDs) or dot sign units which flip over and are alternatively illuminated when flipped over in order to spell out a message on the sign.

The environment such signs are used in are highly deleterious to electrical and mechanical mechanisms due to moisture, salt, dirt, debris, temperature variations, wind, ice, etc. Thus, such signs need to be resistant to these elements. Moreover, such signs need to be easily cleaned to remove these elements, particularly where they may obstruct the visibility or readability of the sign.

Because electrical power may not be available at the sit of the hazard or obstruction, the sign should operate off batteries. However, the batteries should also be rechargeable from solar energy because of the limited charge lifetime of any battery. Therefore, the sign should have a solar panel for recharging the batteries.

There is a need for a mobile sign with a solar panel which can be adjusted to the position of the sun without moving the trailer, in order to maximize the ability of the solar panel to charge the batteries.

A mobile highway sign must also have a display that is highly visible under a variety of lighting conditions. Reflected glare from the sun or other external light sources should be minimized while the contrast of the sign's display should be maximized. There is a need for a mobile sign with a display that minimizes reflected glare and at the same time maximizes the contrast of the display.

Heat from the sun may reduce the life of electronic components of the sign and of display elements such as light-emitting diodes (LED). There is a need for a sign with a display which reduces the amount of heat from the sun entering the display.

SUMMARY OF THE INVENTION

A preferred embodiment of the present invention is a mobile sign with a solar panel for warning motorists of highway problems. The mobile sign comprises support structure configured as a wheeled vehicle. In preferred embodiments, the sign panel comprises an enclosure or housing having a front transparent panel, a multiplicity of LED's in a matrixical arrangement for generating electronically changeable messages mounted in the enclosure and spaced from the front panel, and a pattern of opaque material, for example paint, applied on the exterior of the front transparent panel defining a plurality of windows for passing light therethrough.

In a preferred embodiment, the windows will be in a matrixical arrangement comprising a plurality of rows and columns of individual LED's or rows and columns of groupings of LEDs, such that individual LED's or a grouping or cluster of LED's are associated with a specific window. A specific window may thus have one or more LED's. The light pattern from each LED will be cast through its respective window to be visible to the intended view, such as a passing motorist.

A principal object and advantage of the invention is that the sign panel has a low-glare, high-contrast display that also improves the lifetime of the display's electronic or mechanical components by reducing heating of the display due to the sun. Moreover, the messages displayed are more readable due to low glare-high contrast front panel.

A further object and advantage of the invention is that the opaque material is preferably applied as a liquid material, for example a paint, onto the outside surface of the transparent front panel and is allowed to cure or dry whereby a layer that is sealed to transparent front face is provided, precluding entry of moisture, debris, or other contaminants between the opaque layer and the front face of the front panel. Such application provides a durable, lightweight, easy to manufacture and inexpensive opaque layer with a continuous bonding between the opaque layer and the front panel surface.

A feature and advantage of the invention is that use of paint to create the opaque zones creates a surface highly amenable to cleaning and resistant to the elements associated with roadside usage. For example, the transition between the transparent window and the opaque areas is generally a smooth transition with paint and provides a thickness of, for example, 0.45 mm to 2.0 mm. Such a smooth transition and minimal thickness of the opaque layer as well as the continuous bonding between the opaque layer and the surface of the transparent panel facilitates cleaning and provides the resistance to the elements.

A principal object and advantage of certain embodiments of the invention is that the sign has a solar panel which is tiltable and rotatable relative to the frame of the wheeled vehicle, thus making it easy to change the angle of the solar panel relative to the sun. The most electricity is generated from a solar panel when the sun's rays are perpendicular to the face of the solar panel. Accordingly, the sign has a solar panel which is tiltable and rotatable relative to the sign and to the wheeled vehicle in order to position the solar panel so that the sun's rays are most nearly perpendicular to it. The optimum position will vary from hour to hour, day to day, and month to month. The sign may be left at the site for a few hours or a few weeks or several months. The position of the solar panel is easily adjustable at whatever frequency makes sense.

Another object and advantage of certain embodiments of the present invention is that the position of the solar panel may be adjusted without moving the wheeled vehicle, thereby accommodating situations where the wheeled vehicle cannot be moved because of the presence of other nearby objects.

Another object and advantage of certain embodiments of the present invention is that the solar panel is mounted on a mast so that it may be elevated above the sign panel, thereby preventing the sign panel from blocking the sun.

Another object and advantage of certain embodiments of the present invention is that the tilting and rotation of the solar panel is accomplished by controls at the level of the standing human operator, thereby making it easy to position the solar panel above the sign panel without a ladder.

Another object and advantage of certain embodiments of the present invention is that the solar panel tilts to a completely horizontal position for transport, thus minimizing wind resistance.

Another object and advantage of certain embodiments of the invention is that the front face of the display may be tiled so as to minimize reflected glare from the sun and to make the display self-shading.

BRIEF DESCRIPTION OF THE DRAWINGS

FIG. 4 is a left side elevational view of the solar panel tilted to a horizontal position for transport, with some structure cut away.

FIG. 5 is a left side elevational view of the solar panel tilted above the sign panel for use, with some structure cut away.

FIG. 6 is a left side elevational view of the mechanism which tilts the solar panel, with some structure cut away.

FIG. 10 is a top perspective view of an interchangeable display unit with some structure broken away. One of the two attachment points is shown in phantom, indicating that the display unit may be attached to a support member in either of two orientations.

DETAILED DESCRIPTION OF THE PREFERRED EMBODIMENTS

Figure 1:
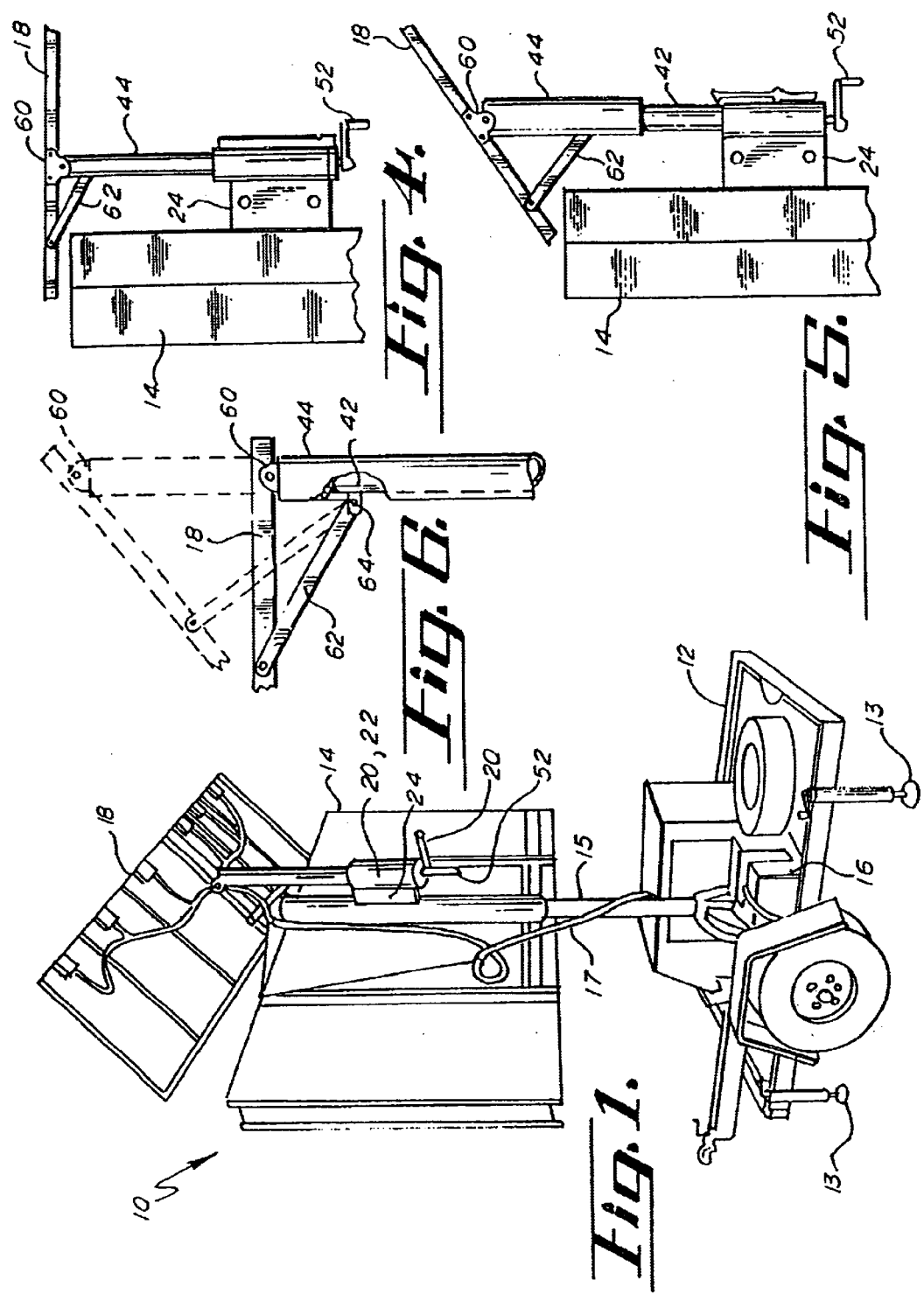
FIG. 1 is a perspective view of the mobile sign with solar panel.

The mobile sign with solar panel of the present invention is generally shown in the Figures by the number 10. The mobile sign with solar panel 10 comprises a wheeled vehicle 12, for example a trailer, for carrying the sign to the place of use, for example along the side of a highway. When the wheeled vehicle 12 reaches the place of use, the wheeled vehicle 12 is positioned relative to oncoming vehicular traffic and the legs 13 are extended, thereby establishing a firm base to support the sign.

The mobile sign with solar panel 10 further comprises an electrically operated sign panel 14 and controls for the sign panel 14. The sign panel 14 is mounted on the wheeled vehicle 12. In the preferred embodiment, the sign panel 14 is mounted on the wheeled vehicle 12 by a first mast 15. The mounting of the sign panel 14 by the first mast 15 is such that the sign panel 14 is rotatable relative to the wheeled vehicle 12, thus allowing the sign panel 14 to be independently positioned to face the oncoming traffic without moving the wheeled vehicle 12. This arrangement accommodates situations in which the wheeled vehicle 12 cannot be moved because of the present of other nearby objects, or where it is just simpler to rotate the sign. Mounting the sign panel 14 on the first mast 15 also allows the sign panel to be raised to an appropriate height to be visible to vehicular traffic, or lowered onto the wheeled vehicle 12 for transportation.

The sign panel 14 is capable of displaying messages and changing the displayed messages as directed by the operator. Messages may be displayed by means of light-emitting diodes or by dot sign elements which flip over to show a reflective surface. The light-emitting diodes or dot sign elements are generally known as pixels, and are arranged in patterns on the sign 14 so that when the pixels are activated, they form letters of the alphabet, numbers, or other characters.

A chargeable battery 16 on the wheeled vehicle 10 provides power to the sign panel 14 and is connected to the sign panel 14 by appropriate cabling (not shown).

An electricity generating solar panel 18 is connected to the battery 16 by a cable 17 in order to charge the battery 16 during the daylight hours. The sign panel 14 then runs off the battery 16 during night-time hours. The sign panel 14 can also operate off the batter 16 while the battery 16 is being charged.

The mobile sign with solar panel 10 further comprises a means 20 for mounting the solar panel 18 on the wheeled vehicle 12. In the preferred embodiment the means for mounting 20 is a second mast 22, which is mounted on the first mast 15. This arrangement allows the solar panel 18 to be tilted and rotated relative to the wheeled vehicle 12 independently of the rotation of the sign panel 14. Thus, the sign panel may be positioned to face oncoming traffic independently of positioning the solar panel 18 to face the sun.

Figure 2:
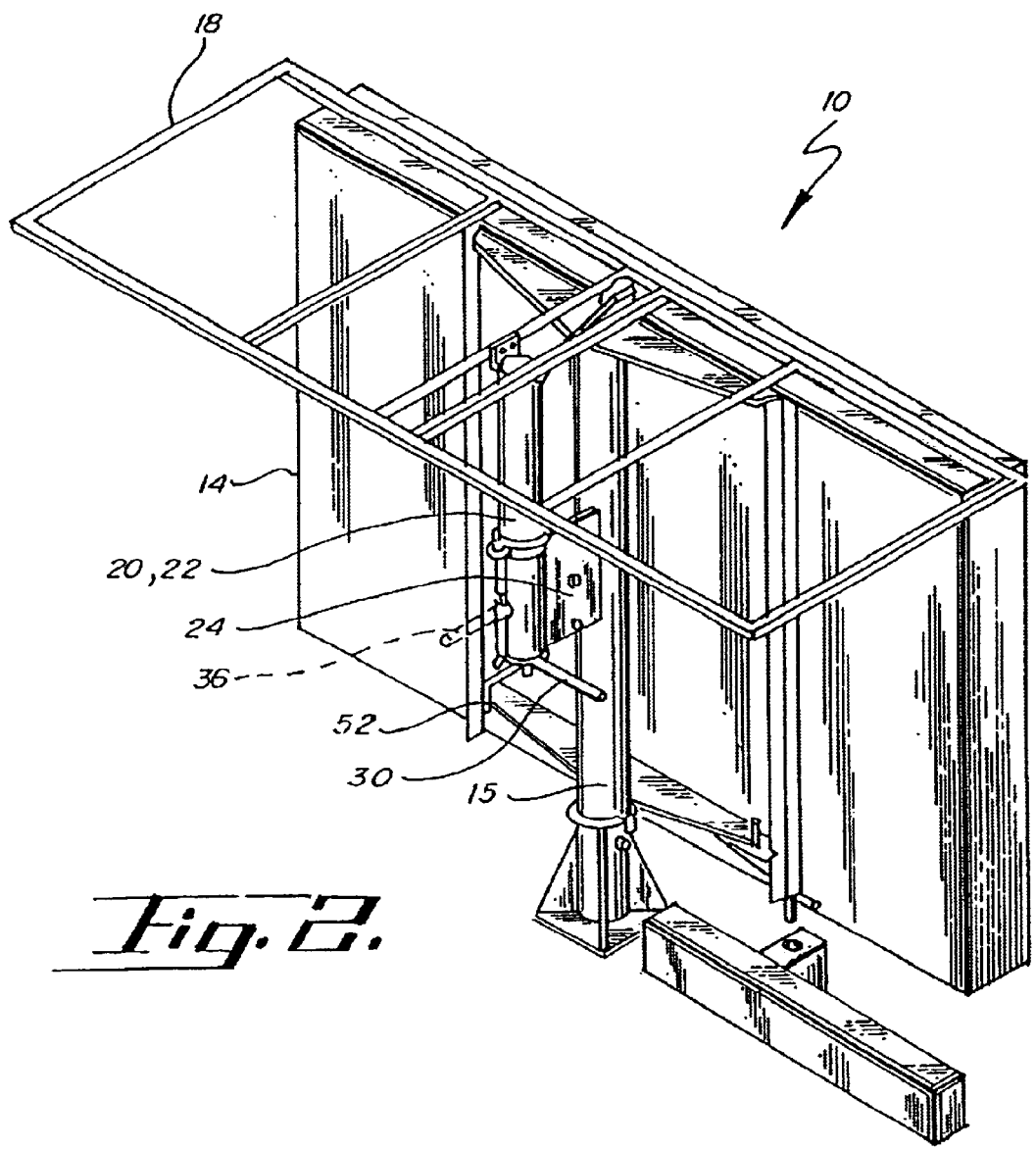
FIG. 2 is another perspective view of the mobile sign with solar panel showing details of the lifting and rotation mechanisms.
Figure 3:
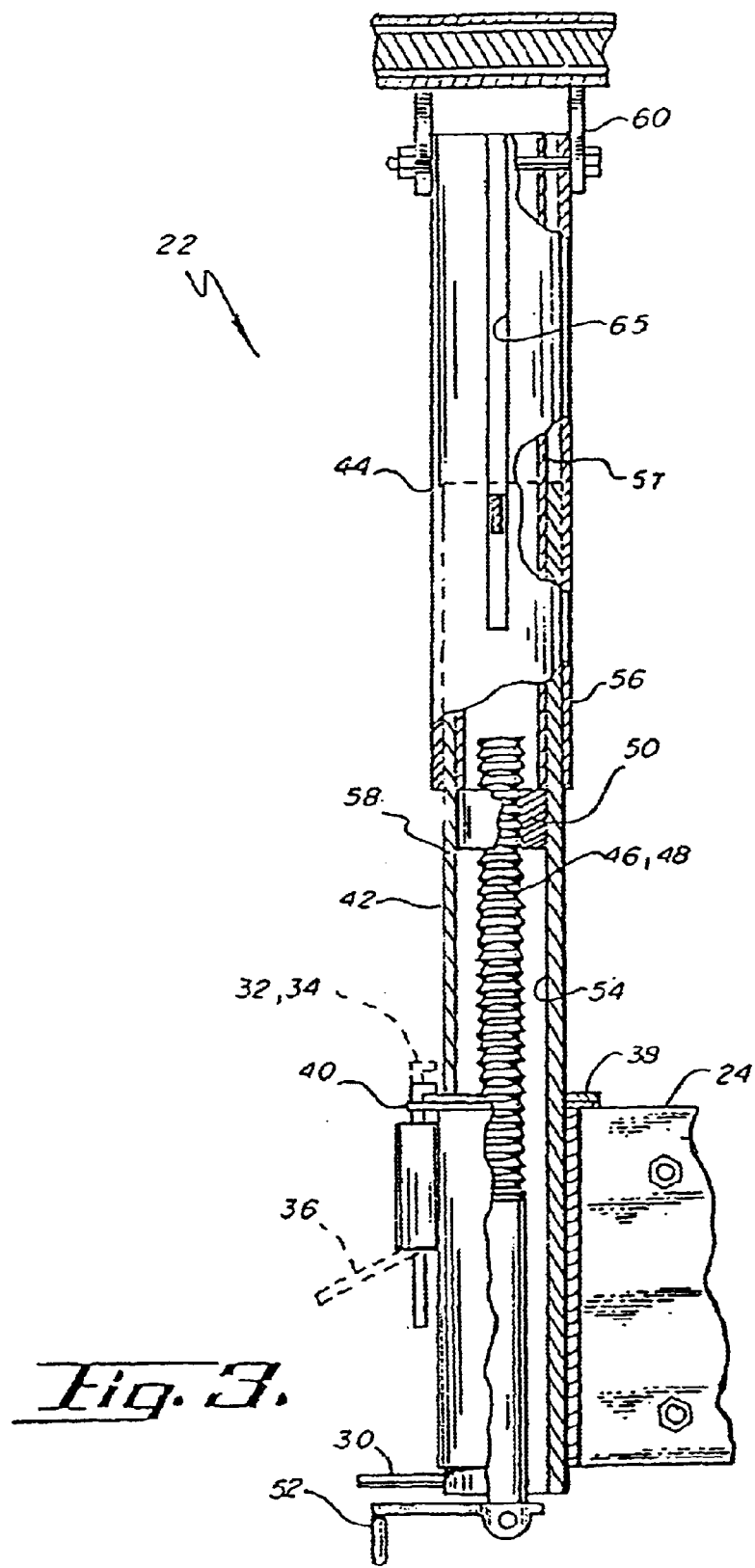
FIG. 3 is a right side elevational view of the mechanism which supports, rotates and tilts the solar panel, with some structure cut away.

As best seen in FIGS. 2 and 3, the second mast 22 further comprises a frame 24 for mounting the second mast 22 to the wheeled vehicle 12, and in particular for mounting the second mast 22 to the first mast 15, which is in turn mounted on the wheeled vehicle 12. The second mast 22 is swingably mounted to the frame 24, allowing the second mast 22 to rotate freely with respect to the frame 24 and wheeled vehicle 12. In the preferred embodiment, the second mast 22 has a flange 38 which rotates against a corresponding flange 40 of the frame 24, thus enabling this swinging movement.

Controls for rotating the sign panel and rotating and tilting the solar panel are conveniently at the level of a standing human operator. The second mast 22 is rotated by the operator by grasping the handle 30 and turning the handle 30 in a clockwise or counterclockwise direction. The solar panel may thus be easily positioned to directly face the sun. Because the most electricity is generated from a solar panel when the sun's rays are perpendicular to the face of the solar panel, the operator may easily rotate the solar panel to track the sun, doing so at whatever frequency makes sense: hourly, daily, or monthly.

Once the solar panel is correctly positioned, the second mast 22 is prevented from rotating further by a brake 32. In the preferred embodiment, the brake 32 consists of a clamp 34 and clamp handle 36. In the unlocked position, shown in phantom in FIG. 3, the clamp handle 36 is raised, lifting the clamp away from the flange 38. When the handle 36 is lowered, the clamp 34 is secured against the flange 38, preventing rotation of the flange 38 against the second flange 40 of the frame. Other equivalents of the brake 32 may of course be employed.

In particular, the second mast 22 comprises a stationary portion 42 mounted to the frame 24 and an extendible portion 44 connected to the stationary portion 42. As best seen in FIG. 3, the extendible portion 44 is slidably engaged with the stationary portion 42, thereby allowing the extendible portion 44 to be raised and lowered on the stationary portion 42. As the extendible portion 44 is raised and lowered, the solar panel 18 is tilted, as will be further described below.

The extendible portion 44 is raised and lowered on the stationary portion 42 by a jack 46. In the preferred embodiment, the jack 46 comprises a low-pitch screw 48 and nut 50 and a crank 52 adapted to rotate the screw 48. In this embodiment, the screw 48 rotates within a longitudinal bore 54 within the stationary portion 42, the stationary portion 42 being a hollow tube. The nut 5 is connected to the extendible portion 44. As the crank 52 is turned, the screw 48 rotates, and the nut 50 travels along the screw 48, thus raising or lowering the extendible portion 44 on the stationary portion 42. The low pitch of the screw 48 prevents the weight of the solar panel from rotating the screw, thus keeping the extendible portion raised.

In the preferred embodiment, the extendible portion 44 is also a hollow tube, comprising an outer wall 56 and inner wall 57 spaced from each other and encompassing the wall 58 of the stationary portion 42, the extendible portion 44 thereby sliding longitudinally on the stationary portion 42 in a telescoping fashion.

To enable tilting of the solar panel 18 as the extendible portion 44 is raised and lowered, the solar panel 18 is connected to the extendible portion 44 by a joint 60 and a linkage 62. The solar panel is shown in its lowered portion for transportation in FIG. 4. As can be seen best in FIGS. 5 and 6, raising the extendible portion 44 and the linkage 62, as the linkage 62 pivots about a bracket 64 fixed to the stationary portion 42. This movement causes the solar panel 18 to tilt upwardly along a single axis, and the rigid linkage 62 prevents the solar panel 18 from contracting the sign panel 14. The solar panel 18 is shown tilted upwardly in FIG. 5. It will be seen that the solar panel 18 may thus be raised above the sign panel 14, thus preventing the sign panel 14 from blocking the solar panel 18 from the sun.

As the extendible portion 44 slides along the stationary portion 42, a longitudinal slot 65 is in the extendible portion slides past the linkage 62, thus preventing the linkage 62 from interfering with the motion of the extendible portion 44.

Figure 7:
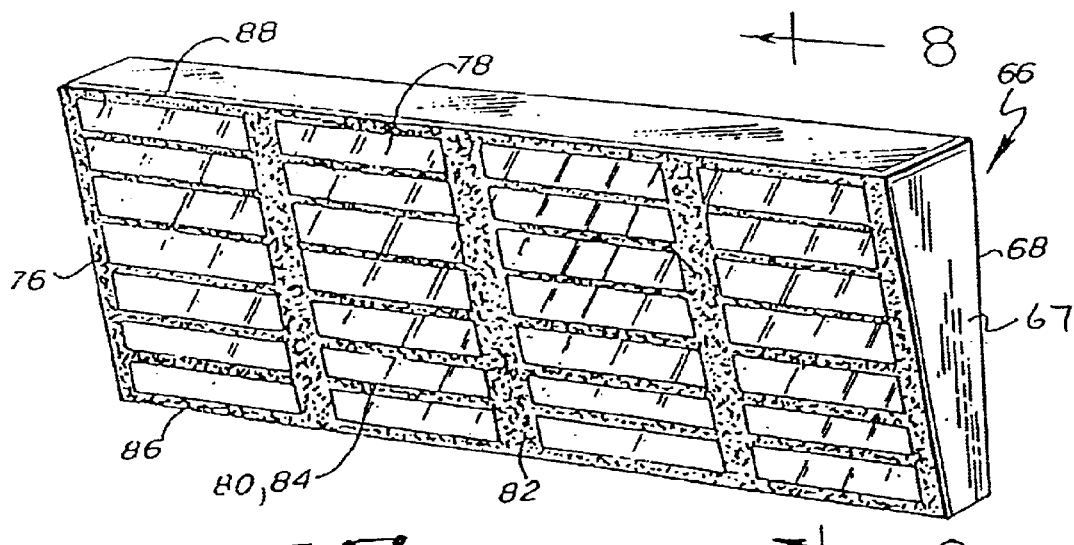
FIG. 7 is a perspective view of the low-glare, high-contrast display used in a mobile sign.
Figure 8:
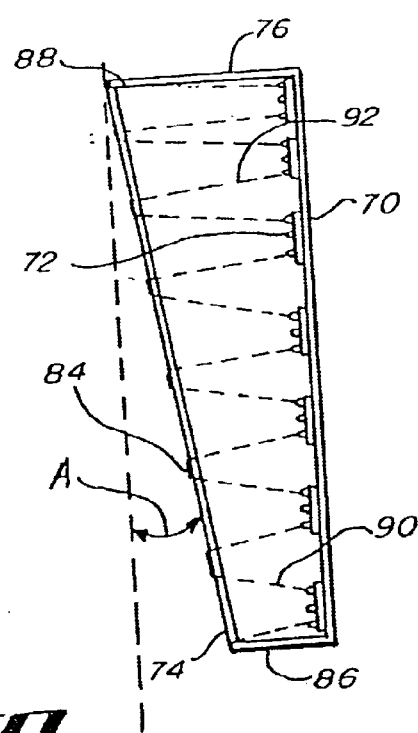
FIG. 8 is a cross-section through the display of FIG. 7 along the lines 8—8.

The mobile sign with solar panel also comprises a high-contrast display 66 for displaying messages to vehicular traffic, as best seen in FIGS. 7 and 8. The front panel 74 of the display 66 protects the display and its support mechanics or electronics by reducing heat within the display 66 caused by sunlight and thus increasing the mean-time-between-failure (MTBF) of the display pixels and electronics. The front panel 74 of the display also produces an improvement in sign contrast.

The high-contrast display 66 is an enclosure that comprises an enclosure portion or housing 68, which includes a substantially vertical rear panel 70 having a plurality of changeable message pixels 72 mounted thereon. In the preferred embodiment, the pixels 72 are light-emitting diodes (LEDs). The pixels may also be dot sign elements that flip over to show a reflective or fluorescent surface.

The enclosure also include the front transparent panel 74 is made of a transparent and substantially rigid material such as polycarbonate or glass. Lexan® is a registered trademark of the General Electric Co. for polycarbonate plastics and has been found to be very suitable for the front panel. The front panel 74 is spaced from the rear panel and the bottom edge 86 is closer to the rear panel 70 than the top edge 88, and the front panel 74 is therefore tilted downwardly relative to the rear panel 70 at an angel A in the range of 5 degrees to 10 degrees, preferably 7 degrees. The tilted front panel 74 reflects light from the sun towards the ground and away from oncoming traffic, thus minimizing the glare seen by drivers and increasing the visibility of the display. The tilted front panel 74 also decreases heating of the display by reflecting sunlight. The tilted display also decreases heating from the sun by making the display substantially self-shading when the sun is highest, in that the top panel 77 of the display 66 projects substantially outwardly and will shade the pixels 72 and other electronics when the sun is at a high angle.

The display 66 also comprises a substantially non-reflective pattern 76 on the front panel 74. In the preferred embodiment, the pattern 76 is painted on the front surface of the front panel 74, as by silk-screening or other method. As best seen in FIG. 7, the pattern 76 comprises a multiplicity of windows 78 and opaque zones 80. The windows 78 permit light from them message pixels 72 to pass through the front panel 74. The opaque zones reduce the amount of sunlight entering the display, thus reducing heat within the display and further protecting the mechanical and electronic elements. Because the pattern 76 is on the front surface of the front panel 74, and is non-reflective, reflected glare is also reduced. Furthermore, the pattern 76 breaks up the front pane 74 into multiple surfaces, further reducing reflected glare. The pattern 76 also improves the contrast of the display 66.

In the preferred embodiment, the opaque zones 80 comprise vertically extending opaque areas 82 ad horizontally extending opaque areas 84, thus producing a pattern 76 with rows and columns, such as seen in FIG. 7. The message pixels 72 are also arranged in rows and columns on the rear panel 70, corresponding to the windows 78 between opaque zones 80.

As can be seen in FIG. 7, in one embodiment, the height of the horizontally extending opaque areas 84 progressively decreases from the bottom edge 86 of the front panel 74 towards the top edge 88 of the front panel 74. The purpose of this arrangement is to accommodate the tilt of the front panel 74 and maximize the light from the pixels 72 passing through the front panel 74. As can be appreciated from FIG. 8, near the bottom edge 86 of the panel 74, the front panel 74 is nearly parallel and close to the rear panel 70 and the pixels 72. Consequently, light rays 90 from the pixels 72 do not spread out very much before they reach the front panel 74. Therefore, the windows 78 near the bottom edge 86 of the panel 74 need be no larger than the extent of the corresponding pixels 72, and the height of the horizontally extending opaque areas between the windows can be large. However, near the top edge 88 of the front panel 74, the front panel is angled to and substantially further from the rear panel 72. Consequently, light rays 92 from pixels 72 have substantially spread out as they reach the front panel 74. Furthermore, the tilt of the front panel 74 near the top edge 88 changes the viewing angle of the pixels. For these reasons, the windows 78 near the top edge 88 of the front panel 74 must larger than the corresponding extent of the pixels 72, and therefore, the height of the horizontally extending opaque area 84 between the windows 78 must be less.

It has been found that the combination of a tilted front panel 74 and a pattern 76 painted on the front panel 74 also produces unexpected improvement in terms of sign contrast. By minimizing glare and providing opaque areas 80, the visibility of the message pixels 72 is substantially improved.

Figure 9:
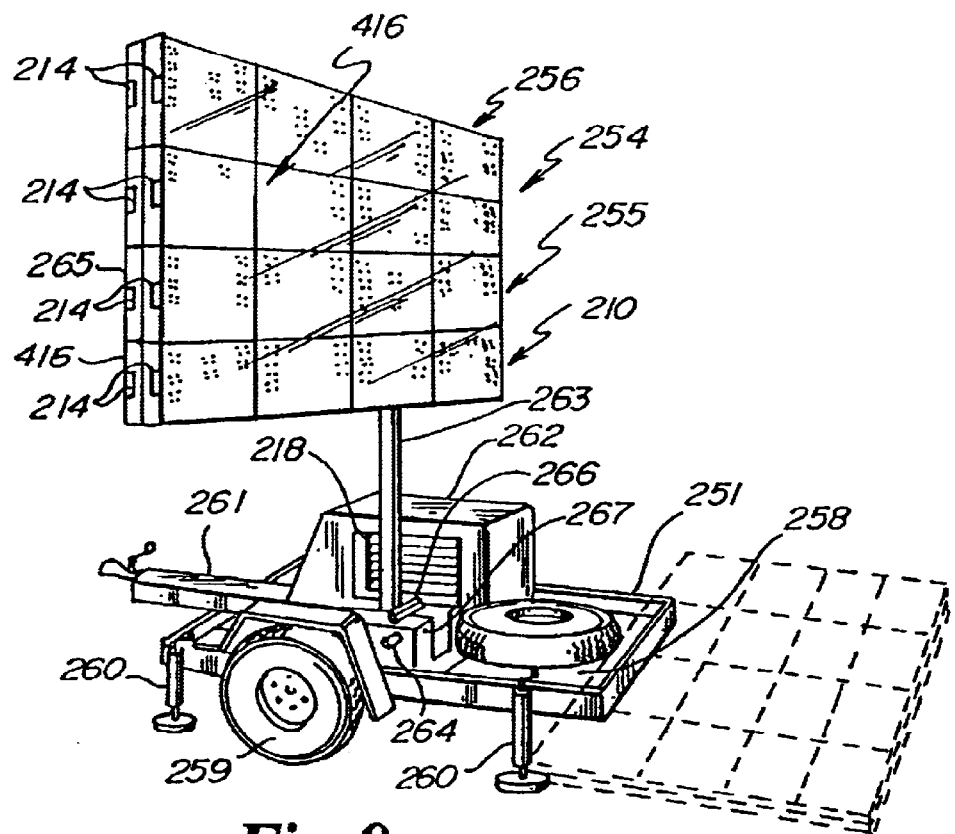
FIG. 9 is a perspective view of a modular sign mounted on a moveable mounting structure.
Figure 14:
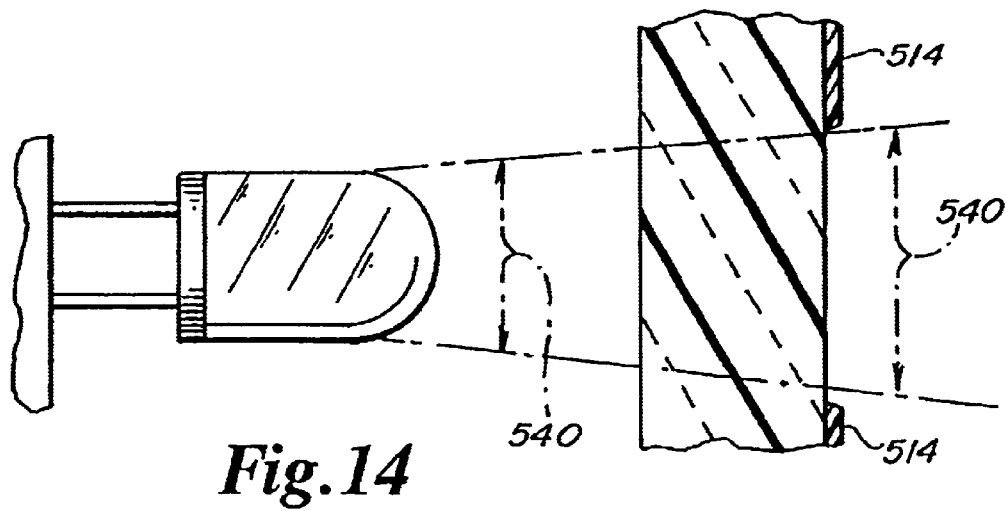
FIG. 14 is a cross-sectional view of an enclosure portion in accord with the invention.

Referring to FIGS. 9 and 10, a trailer mounted modular sign is shown. The modular electronic sign 210 generally comprises a plurality of connected display units 212, a plurality of mounting tracks 214 mounted on a mounting structure 216 and a sign controller 218. As illustrated in FIG. 1, the mounting tracks 214 may be mounted back-to-back to form a two sided sign 210.

A typical sign 210 may be made from a plurality of display units 212 on mounting tracks 214 mounted parallel to each other and attached to the mounting structure by clips 270. Each display unit 212 mounted on the mounting track 214 may display one or more characters and is vertically aligned with the display units 212 on adjacent mounting tracks 214 to form a pattern of display units 212 on the sign 210. It should be understood, the mounting tracks 214 may be mounted in a vertical or horizontal orientation. For purposes of illustration, the sign 210 will be discussed with reference to horizontally mounted mounting tracks 214.

The mounting structure 216 may comprise a trailer 251, having a platform 258 supported by wheels 259 rotatably mounted on the platform 258 as is well known in the art of trailers. Trailer 251 may have one or more jack stands 260 which are extendable to engage the ground to hold the platform 258 in a fixed position. A vehicle connector 261, such as a trailer hitch, may be used to move the mounting structure 216 to a proposed sign 210 installation location. An enclosure 262 on platform 258 may be used to provide environmental protection for sign controller 218.

Sign support 263 is attached to and supports sign plate 265 which may have a front side and a back side. The sign support 263 may be pivotally attached to the platform 258 at pin 264 and held in a vertical position by lock 266 and side supports 267. It should be understood that pin 264 extends into both side supports 267 and through the sign support 263.

Trailer 251 may also be used to transport sign 210 by removing lock 266 and pivoting sign support 263 about pin 264 until sign support 263 is in the horizontal position, as shown in dotted outline. Vehicle connector 261 is attached to a vehicle (not shown) such as a tractor, car or truck, the jack stands 260 are retracted to raise the jack feet to a non-engagement position with the round or road surface. Lock 266 may be replaced across the side supports 267 to hold the sign support 263 in the horizontal position. It should be understood that sign 210 may alternatively be attached to a bridge, existing highway sign or building.

Referring to FIG. 9, the display units 212 are assembled to form a sign 210. The sign controller 218 is attached to a communication conductor (now shown) of each mounting track 214, and may have several information lines connected to separate mounting tracks 214. Alternatively, the mounting tracks 214 may have the communication conductor wired together in series. The wires connecting the sign controller 218, including a power supply may be run inside the sign support 263.

Referring to FIGS. 9 and 10, the modular sign assembly 210 also comprises a plurality of enclosed, interchangeable display units 212, each with a generally rectangular front side 418 and opposite back side 420.

Each display unit 212 further comprises a housing 424 having a back side 420 and a front side 418. The front side 418 preferably includes a front panel 426, the front panel 426 having a plurality of light transmitting windows 428. A plurality of light emitters 430 is enclosed in the housing 424 preferably adjacent to the windows 428 on the front side 426.

The modular sign assembly 210 also preferably includes a sign controller 218, as previously described. The sign controller 218 is in communication with each display unit 416. The modular sign assembly 210 has means for sending control signals from the sign controller 218 to each display unit 212 for controlling the selection of light emitters 430 for illumination. It should be understood that one of the conductors 416 is the communications conductor.

In the preferred embodiment, the light emitters 430 are light-emitting diodes.

Referring to FIG. 10, the front panel 426 has a front side 427. Preferably, the front panel 426 is an ultraviolet-resistant polycarbonate material. An opaque material 470 is painted on the front side 427 to decrease glare from the front panel 426. The windows 428 are arranged in the opaque material 470, corresponding to the light emitters 430. In this manner, the contrast between the light emitters 430 and the sign assembly 210 is maximized. Preferably, the opaque material 470 is painted on the front side 427 by silk-screening, although any other painting method may be used. The ink used to paint the opaque material is preferably dark black to maximize contrast and minimize glare from the front panel by creating a low-gloss finish.

The method of forming a sign which embodies the above concepts will now be briefly discussed. First, the size of the sign is determined according to the nature of the application. Then, the housing components including the rear panel are fabricated. The rear panel includes an outer surface and an inner surface. The inner surface supports indicia which may be in the form of a plurality of message pixels, or a plurality of releasably retained message panels which are provided with message pixels. Next, a front panel is formed. The front panel is sized to so that it is coincident with the rear panel (which may provided with a plurality of message pixels), or coincident with a message panel. The front panel is preferably transparent and includes front and rear surfaces. Paint is preferably applied to the front surfaces rather than the rear surface so that reflection from incident light is minimized. The paint used is preferably opaque, with a high contrast relative to the message pixels. The paint should also be non-reflective for best results. A black modified acrylic outdoor ink is preferred. It has been found that applying paint by silk screening is preferred. It has been found that applying paint by silk screening produces the best results. The silk screen is provided with a pattern which produces a plurality of apertures or non-painted transparent windows on the front surface of the transparent front panel. The apertures correspond to groupings of LED's, conveniently individual message pixels, and enable light emanating therefrom to pass through the front panel to an observer. After the front panel has been provided with paint and allowed to cure, for example dry, the front panel is then attached to the display or message panel in a conventional manner.

Figure 11:
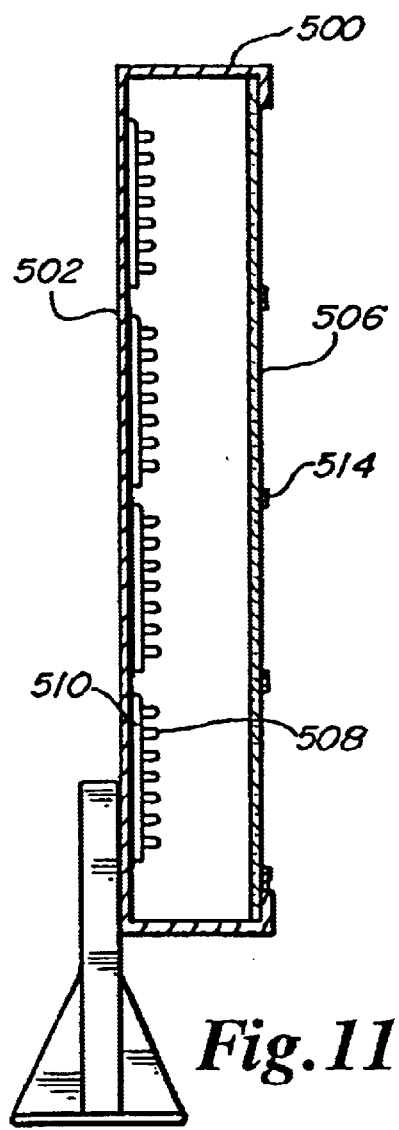
FIG. 11 is a cross-sectional view of an enclosure in accord with the invention.
Figure 13:
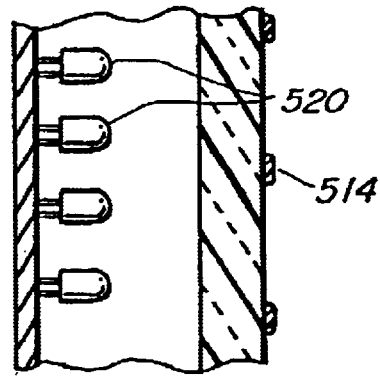
FIG. 13 is a cross-sectional view of an enclosure portion.
Figure 12:
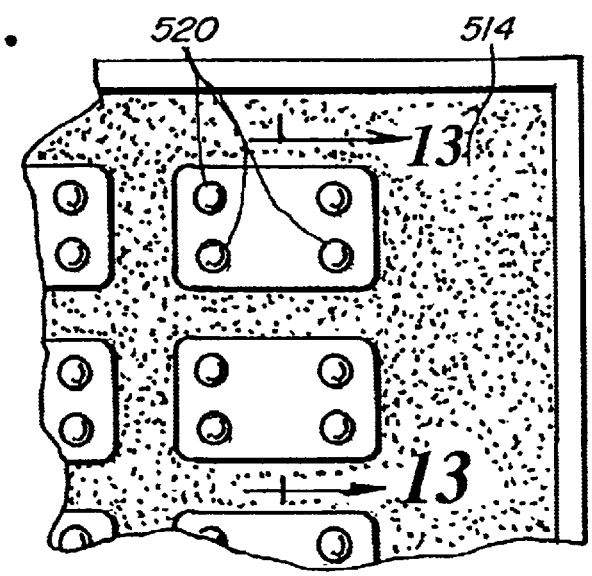
FIG. 12 is a partial front elevational view of an enclosure portion in accord with the invention.

Referring to FIGS. 11, 12, 13, and 14 details of the enclosure arrangement with respect to the LED's is illustrated. Generally, a sign enclosure 500 to be mounted on a wheeled vehicle comprises an enclosure portion 502 and a front transparent panel 506. A multiplicity of LED's 508 are mounted to circuit boards 510 or other mounting means and are positioned in the enclosure behind the front transparent panel 506. The opaque coating 514, shown in exaggerated thickness on FIG. 11, is applied to the front surface preferably in a liquid form, such as by silk-screening as previously described, to provide outlines about groupings 520 or clusters of the LED's, defining transparent windows. The transparent windows are configured to have 1 or more LED's projecting therethrough. The opaque coating is selected to provide a hermetic bonding to the transparent panel whereby debris and moisture cannot enter the interface between the opaque material and the transparent front panel. The LED's have a projection zone 540 that is aimed at the front transparent panel and the transparent window 544 formed thereon. Preferably the projection zone will be smaller than the respective transparent window defined by the opaque material at the point it passes through said window on the front surface. Preferably the LED will be at least 5 mm from the front transparent panel.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A method of making a mobile sign for temporary placement along roadways for directing messages to vehicular traffic on said roadways, the method comprising:
    arranging a multiplicity of light emitting diodes in at least one matrix and orienting each light emitting diodes in a common direction,
    placing the at least one matrix in an enclosure portion,
    attaching a transparent front panel to the enclosure portion, with the at least one matrix of light emitting diodes directed toward said transparent front panel and spaced from said transparent front panel,
    making the enclosure portion and transparent front panel weather resistant,
    operably connecting control circuitry to the multiplicity of light emitting diodes for providing changeable messages formed by selective lighting of the multiplicity of light emitting diodes,
    applying paint to an exteriorly facing surface of the transparent panel to define a plurality of unpainted windows, with said unpainted windows positioned directly in front of at least individual ones of the multiplicity of light emitting diodes, and
    mounting the enclosure portion and control circuitry on a wheeled vehicle.

2. The method of making a mobile sign for temporary placement along roadways of claim 1 wherein the step of applying paint to the exteriorly facing surface of the transparent panel is performed before the step of attaching a transparent front panel to the enclosure.

3. The method of making a mobile sign for temporary placement along roadways of claim 2 wherein each unpainted window is directly in front of a grouping of at least two and not more than six light emitting diodes.

4. The method of making a mobile sign for temporary placement along roadways of claim 1 further comprising the step of attaching a solar panel to the wheeled vehicle for providing power to the sign.

5. The method of making a mobile sign for temporary placement along roadways of claim 1 further comprising the step of applying the paint to the exteriorly facing surface of the front transparent panel by way of silk-screening.

6. A portable sign made in accordance with claim 1.

7. A method of making a sign for temporary placement along roadways for directing messages to vehicular traffic on said roadways, the method comprising:
    arranging a multiplicity of light emitting diodes in a matrixical arrangement and orienting each light emitting diodes in a common direction contained within at least one weather resistant enclosure, each weather resistant enclosure comprising an enclosure portion and a transparent front panel, each transparent front panel having an interiorly facing surface and an exteriorly facing surface,
    applying in liquid form an opaque material to each of the transparent front panels to provide opaque outlines around groupings of the multiplicity of the light emitting diodes thereby forming a matrixical arrangement of transparent windows in each of said transparent front panels, each of said transparent windows adjacent a grouping of one or more light emitting diodes,
    connecting electrical circuitry to the multiplicity of light emitting diodes for selectively lighting said diodes for providing messages comprised of a plurality of words or abbreviated words,
    mounting the multiplicity of light emitting diodes, at least one weather resistant enclosure, and electrical circuitry on a portable sign structure placeable adjacent roadways.

8. The method of making a mobile sign for temporary placement along roadways of claim 7 wherein the step of applying liquid opaque material to the transparent panel is performed before attaching a transparent front panel to the enclosure portion.

9. The method of making a mobile sign for temporary placement along roadways of claim 7 further comprising the step of attaching a solar panel to the wheeled vehicle for providing power to the sign.

10. The method of making a mobile sign for temporary placement along roadways of claim 7 wherein the step of applying the opaque material to the front transparent panel is by way of silk-screening.

11. A portable sign made in accordance with claim 7.

12. A mobile sign for temporary placement along roadways for directing messages to vehicular traffic on said roadways, the sign comprising:
    a wheeled vehicle,
    at least one weather resistant enclosure containing a multiplicity of light emitting diodes in a matrixical arrangement with each of the light emitting diodes oriented in a common direction, the each of the weather resistant enclosures comprising an enclosure portion and a transparent front panel attached to the enclosure portion, the multiplicity of light emitting diodes in said enclosure directed toward said transparent front panel and spaced from said transparent front panel, control circuitry operably connecting to each of the multiplicity of light emitting diodes for providing changeable messages formed by selective lighting of the multiplicity of light emitting diodes, a rigid opaque coating hermetically adhered to the exteriorly facing surface of the front transparent panel, the opaque coating selectively positioned to define a plurality of matrixically arranged transparent windows with groupings of at least one of the multiplicity of light emitting diodes positioned behind each of the transparent windows.

13. The mobile sign of claim 12 further comprising a solar panel mounted on said wheeled vehicle, the solar panel operatively connected to the circuitry for providing power to said sign.

14. The mobile sign of claim 12 wherein the sign is sized so that characters formed by said light emitting diodes are readable from at least 150 feet.

15. A mobile sign for temporary placement along roadways for directing messages to vehicular traffic on said roadways, the sign comprising:

a wheeled vehicle, at least one weather resistant enclosure containing a multiplicity of light emitting diodes in a matrixical arrangement with each of the light emitting diodes oriented in a common direction, the multiplicity of light emitting diodes having a plurality of groupings in a matrixical arrangement;

each of the at least one weather resistant enclosures comprising an enclosure portion and a transparent front panel attached to the enclosure portion, the multiplicity of light emitting diodes in said enclosure directed toward said transparent front panel and spaced from said transparent front panel, control circuitry operably connecting to each of the multiplicity of light emitting diodes for providing changeable messages formed by selective lighting of the multiplicity of light emitting diodes, and a plurality of transparent windows on the front transparent panel provided by opaque paint silk-screened thereon.

* * * * *